United States Patent [19]
Antal, Jr.

[11] 3,993,458
[45] Nov. 23, 1976

[54] METHOD FOR PRODUCING SYNTHETIC FUELS FROM SOLID WASTE

[75] Inventor: Michael J. Antal, Jr., Los Alamos, N. Mex.

[73] Assignee: The United States of America as represented by the United States Energy Research and Development Administration, Washington, D.C.

[22] Filed: Mar. 28, 1975

[21] Appl. No.: 563,274

[52] U.S. Cl. .................................. 48/209; 48/202; 126/270; 201/31; 250/527; 252/373; 252/473
[51] Int. Cl.² .......................................... C10J 3/00
[58] Field of Search ................. 48/209, 197 R, 111, 48/202, 113, 73, 65; 201/31; 202/234; 250/527; 126/270, 271; 23/288 S; 252/373, 473

[56] References Cited
UNITED STATES PATENTS

| | | | |
|---|---|---|---|
| 3,759,677 | 9/1973 | White | 48/111 |
| 3,850,588 | 11/1974 | White | 48/209 |

FOREIGN PATENTS OR APPLICATIONS

| | | | |
|---|---|---|---|
| 1,496,366 | 5/1969 | Germany | 48/209 |

Primary Examiner—Robert L. Lindsay, Jr.
Assistant Examiner—George C. Yeung
Attorney, Agent, or Firm—Dean E. Carlson; Paul D. Gaetjens

[57] ABSTRACT

Organic solid wastes represented by the general chemical formula $C_XH_YO_Z$ are reacted with steam at elevated temperatures to produce $H_2$ and $CO_2$. The overall process is represented by the reaction $$C_XH_YO_Z + 2(X-Z/2)H_2O \xrightarrow{\Delta} XCO_2 + [(Y/2) + 2(X-Z/2)] H_2 . \quad (1)$$

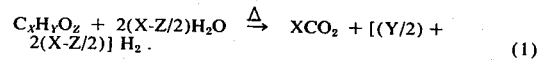

Reaction (1) is endothermic and requires heat. This heat is supplied by a tower top solar furnace; alternatively, some of the solid wastes can be burned to supply heat for the reaction. The hydrogen produced by reaction (1) can be used as a fuel or a chemical feedstock. Alternatively, methanol can be produced by the commercial process $$CO_2 + 3H_2 \rightarrow CH_3OH + H_2O . \quad (2)$$

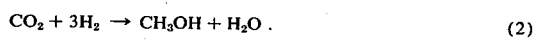

Since reaction (1) is endothermic, the system represents a method for storing heat energy from an external source in a chemical fuel produced from solid wastes.

6 Claims, 1 Drawing Figure

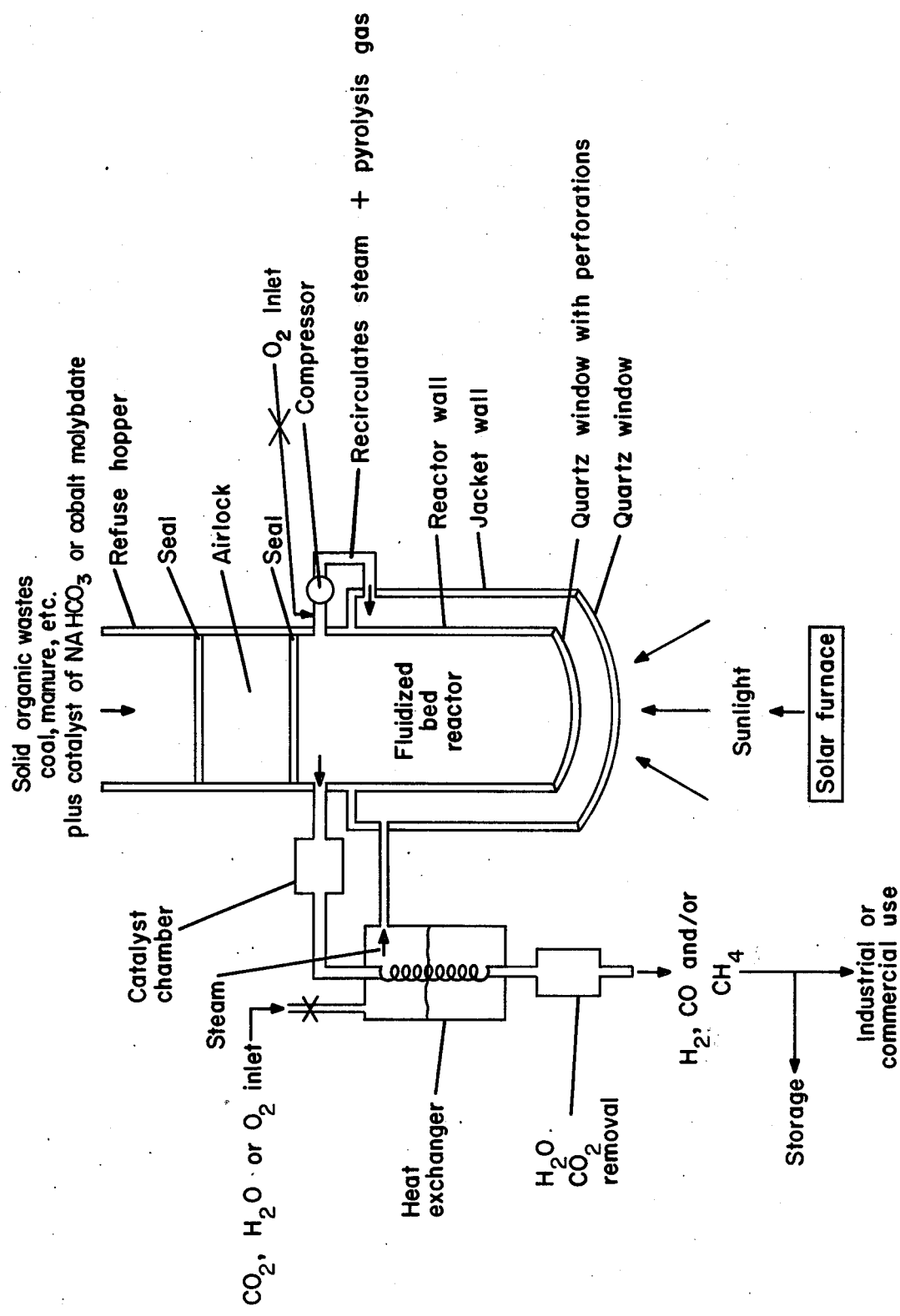

METHOD FOR PRODUCING SYNTHETIC FUELS FROM SOLID WASTE

BACKGROUND OF THE INVENTION

1. Field of the Invention

Past research has suggested that only a small fraction of our nation's energy demand can be met with fuel produced from solid wastes. However, research presently being conducted suggests that hydrogen produced from solid wastes could economically meet the nation's entire natural gas demand. Alternatively, large quantities of methanol could be produced by this system for use as a motor fuel.

The system of this invention uses solar energy to provide heat for the pyrolysis of solid wastes and the gasification of the remaining char. Pyrolysis of solid wastes results in the evolution of $CO_2$, $CO$, $H_2$, $CH_4$ and various other gases, tars, oils, and char. The gaseous and liquid by products are catalytically converted to $H_2$, $CO$, $CH_4$, and $CO_2$ in a steam atmosphere using a commercial nickel catalyst. The remaining char, $CO$, $CO_2$, and $CH_4$ are catalytically reacted according to the following formulae:

$$CH_4 + 2H_2O \rightarrow CO_2 + 4H_2 \quad (3)$$

$$CO_2 + C \rightarrow 2CO \quad (4)$$

$$CO + H_2O \rightarrow CO_2 + H_2 \quad (5)$$

$$C + H_2O \rightarrow CO + H_2 \quad (6)$$

Thus pyrolysis of solid wastes in a steam atmosphere has been used to manufacture a producer gas containing $H_2$, $CO$, and $CO_2$. The $CO$ can be shifted to hydrogen, or reacted with the hydrogen already present to produce methanol using the commercial reaction $$CO + 2H_2 \rightarrow CH_3OH . \quad (2)$$

Alternatively, if a producer gas rich in $CO$ is desired, some $CO_2$ can be added to the steam reactant to produce excess $CO$ via reaction (4).

Reactions (4) and (6) are normally observed at temperatures above 800° C and such temperatures impose severe engineering problems. Catalysts have been used to lower the temperature range for the practice of reaction (6); however, catalysts have not been discovered for reaction (4) using pyrolytic char from solid wastes as a source of carbon. The catalysts cobalt molybdate, $NaHCO_3$, and other alkali metal catalysts have been successfully employed to facilitate reaction (4). The catalysts were dissolved in water and deposited on the char by soaking the char in the catalyst-water solution and subsequently vaporizing the water. Since reactions (3), (5), and (6) require water (steam) this method of catalyst deposition is well suited to the system of interest. The catalyst is recovered by soaking the ash residue remaining after the gasification of the solid wastes in water. Tables 1 and 2 illustrate the effect of the catalysts on reaction (4) for representative space velocities and temperatures.

Table I

BLANK RUNS

Description: $CO_2$ was reacted with char produced by the Monsanto Process containing no catalyst

| Temperature | Space Velocity | % Conversion |
|---|---|---|
| 700° C | 59.3 cm³/min | trace |
| 750° C | 59.3 cm³/min | 4% |

Table I-continued

BLANK RUNS

Description: $CO_2$ was reacted with char produced by the Monsanto Process containing no catalyst

| Temperature | Space Velocity | % Conversion |
|---|---|---|
| 750° C | 10.8 cm³/min | 9% |

TABLE II

CATALYST RUNS

Description: $CO_2$ was reacted with char produced by the Monsanto Process. The catalyst was deposited on the char by the method described in the text

| Temp. | Space Velocity | Catalyst | % Conver. |
|---|---|---|---|
| 700° C | 59.3 cm³/min | $NaHCO_3$ | 5% |
| 750° C | 59.3 cm³/min | $NaHCO_3$ | 12% |
| 750° C | 59.3 cm³/min | Cobalt Molybdate | 8% |
| 750° C | 10.8 cm³/min | Cobalt Molybdate | 16% |

2. Prior Art

The PUROX System (covered by U.S. Pat. No. 3,729,298) was developed by Union Carbide Corporation in response to the need for advanced solutions to the problems of solid waste disposal and resource recovery. The PUROX System utilizes oxygen, instead of air, to produce high-temperature incineration and pyrolysis of all types of refuse. The only products formed are a compact, sterile residue and a fuel gas valuable as a cleanburning source of energy. The basic PUROX System consists of a vertical shaft furnace into which refuse is fed through a charging lock at the top. Oxygen is injected into the combustion zone at the bottom of the furnace where it reacts with carbon char residue from the pyrolysis zone. The temperature generated in the hearth is sufficiently high to melt and fuse all non-combustible materials. The molten material continuously overflows from the hearth into a water quench tank where it forms a hard, sterile granular product. The hot gases formed by the reaction of oxygen and carbon char rise through the descending waste. In the middle portion of the vertical shaft furnace, organic materials are pyrolyzed under an essentially reducing atmosphere to yield a gaseous mixture high in carbon monoxide and hydrogen (typically about 50% CO and 30% $H_2$ by volume on a dry basis). As the hot gaseous products continue to flow upward, they dry the entering refuse in the upper zone of the furnace. The high thermal efficiency of PUROX System is indicated by the relatively low temperature (about 200° F) of the by-product gas exiting through a duct to the gas cleaning section of the system. As it leaves the furnace, the gas mixture contains water vapor, some oil mist formed by the condensation of high-boiling organics, and minor amounts of fly ash. The oil mist and fly ash solids are removed by a gas cleaning system. After cleaning, the product gas is passed through a condenser. The resultant dry gas is a cleanburning fuel, comparable to natural gas in combusion characteristics. Its heating value is approximately 300 BTU/cu.ft. This recovered gas can be used effectively as a supplementary fuel in an existing utility boiler or other fuel-consuming operations without downrating of the boiler or making extensive and costly boiler modifications. Because the gas produced by the PUROX System is essentially sulfur-free and contains only about one-tenth the amount of fly ash allowable under federal air quality standards, it is an ideal fuel for all types of existing gas-fired furnaces.

The system produces four times as much energy as it consumes. Only 20% of the total energy recovered by the system is needed to meet all of its internal energy requirements, including that consumed to produce oxygen used in the furnace. The remaining 80% is available for other fuel applications. This is an important recovered resource, particularly in view of the growing shortage of clean fuels. The granular solid residue produced from the noncombustible portions of the refuse is free of any biologically active material. The volume of solid by product is only about 2 to 3 percent of the volume of incoming refuse, depending upon the amount of noncombustible materials in the mixed wastes. By contrast, a well-designed and efficiently-operated conventional incinerator produces a solid residue volume of 10% or more of the volume of refuse burned. Importantly, the dense granular residue produced by the PUROX System is considered suitable as a construction fill material or for other potentially valuable uses. The PUROX System is notable in another respect. It is designed to use only a small fraction of the oxidant gas required in conventional incineration. The PUROX System requires only one-fifth of a ton of oxygen per ton of refuse, while a conventional incinerator requires approximately seven tons of air per ton of solid waste burned. This 35-fold difference in oxidant gas flow means that the PUROX System will produce only one-twentieth as much gas volume to be cleaned. This factor, in turn, makes it possible to reduce fly ash content in the gaseous emissions to less than one-tenth of that attainable with a conventional incinerator. Combustion of the fuel gas from the PUROX System produces emissions far below the allowable maximum specified by federal air quality standards. The use of oxygen enables the PUROX System to process effectively solid waste of widely varying composition. This flexibility is especially advantageous in adapting to operating variations which commonly result from seasonal, regional, and socio-economic factors. Another important feature of this System is its compatibility with other solid waste disposal facilities either new or existing. It can readily handle refuse in "as received" condition, or it can be used to treat refuse which has been preprocessed by shredding, separation, or resource recovery operations in existing equipment.

COMPARISON OF PRIOR ART AND THE METHOD AND DEVICE OF THIS INVENTION

Similarities:

Both produce a clean-burning gas, eliminate pollution admissions to the atmosphere, are flexible enough to handle a variety of solid wastes, and appear to be economically attractive.

Dissimilarities:

The prior art (PUROX) uses combustion, pyrolysis, and requires a source of pure oxygen which results in a granular residue. The method and device of this invention is a pure pyrolysis process which produces 190% more clean, usable energy per ton of refuse than the prior art. This invention does not leave a granular residue but does require an organic feedstock (separation and classification of the solid wastes) and a high temperature heat source and catalyst. The prior art method does not require a pure organic feedstock, external heat source nor catalyst.

Advantages:

The method and device of this invention produces much more energy per ton of solid waste than the PUROX method. It produces hydrogen, which can be used to replace natural gas in a hydrogen economy, to make fertilizer, or as a chemical feedstock. Alternatively, the hydrogen can be reacted with either $CO_2$ or CO using commercial processes to produce methanol for use as a gasoline additive. It does not produce a granular residue requiring disposal. It does not require a source of pure oxygen (although such a source may prove useful). It provides an attractive method for putting solar energy to use.

SUMMARY OF THE INVENTION

The following three equations, A, B, and C concisely describe the reactions which are the essential steps of this invention.

A. $C_xH_yO_z + 2(X-Z/2) H_2O \xrightarrow{\Delta} XCO_2 + [(Y/2) + 2(X-Z/2)]H_2$ B. $CO + 2H_2 \rightarrow CH_3OH$ C. $CO_2 + 3H_2 \rightarrow CH_3OH + H_2O$

BRIEF DESCRIPTION OF THE DRAWING

The Drawing shows a flow sheet and schematic of this invention for the production of hydrogen by employing a tower top solar furnace for the pyrolysis and gasification of solid waste or other organic materials.

DESCRIPTION OF THE PREFERRED EMBODIMENT

A method for employing an external moderately high temperature heat source in the pyrolysis and gasification of solid wastes, coal, or other organic materials is described as follows: As shown in the Drawing, steam, $CO_2$, or some mixture of these two gases is heated to a temperature of 600° C or more in a chemical reactor located at the focus of a tower top solar furnace which is situated in the lower section of said reactor. This working fluid (steam, $CO_2$, or a mixture thereof) is used to fluidize the reactant bed of char and organic material. For our purposes we assume the material to be solid wastes; however, the process is also suitable for any other type of organic material (coal, manure, food waste, etc.). As further shown in the Drawing solid wastes, shredded or unshredded, depending on the economics of the system, are introduced into the top of the reactor through a feed hopper and an airlock system. At this time they are mixed with a steam-carbon catalyst. The wastes pyrolyze in the intense heat of the working fluid, producing char and a gaseous product containing tars, oils, liquors, and gases ($CO_2$, CO, $CH_4$, and $H_2$). The higher hydrocarbons may be "cracked" catalytically so that the pyrolysis gas contains only $H_2$, $CO_2$, CO, and $CH_4$. The solid char migrates to the bottom of the reactor where it is catalytically gasified by the working fluid using the reactions $C + H_2O \rightarrow CO + H_2$ (7)

$CO + H_2O \rightarrow CO_2 + H_2$ (8)

$$C + CO_2 \rightarrow 2CO \tag{9}$$

$$H_2 + CO \rightarrow \tfrac{1}{2} CH_4 + \tfrac{1}{2} CO_2 \tag{10}$$

$$3/2\, H_2 + \tfrac{1}{2} CO \rightarrow \tfrac{1}{2} CH_4 + \tfrac{1}{2} H_2O \tag{11}$$

The temperatures, catalysts, working fluid, and composition of the solid wastes will determine which of these reactions play a primary role in the gasification process. These gases exit the reactor together with the pyrolysis gases. This producer gas is rich in $CH_4$, $CO$, and $H_2$ and may be manipulated to produce methane using reactions (10) and (11), hydrogen using the reverse of reactions (10) and (11) and reaction (8), or methanol using reaction (2). These reactions may be practiced using standard commercial catalysts. The final product or products of the process is to be determined by economic considerations.

The process just described may be adapted to many special situations. For example, if it is desirable to introduce the working fluid into the reactor at an elevated temperature, part of the producer gas may be recycled and mixed into the working fluid, and a regulated amount of oxygen injected into the recycled producer gas stream. The oxygen mixes with the producer gas and burns according to the reactions $$H_2 + \tfrac{1}{2} O_2 \rightarrow H_2O \tag{12}$$

$$CO + \tfrac{1}{2} O_2 \rightarrow CO_2 \tag{13}$$

$$CH_4 + 2 O_2 \rightarrow CO_2 + 2 H_2O \tag{14}$$

thereby heating the incoming gas stream. Since the by products of reactions (12), (13), and (14) are the constituents of the working fluid (or may be chosen to be by introducing only the $H_2$ or $CO$ portions of the producer gas) they do not contaminate the gas stream in any way. Moreover, this provides an extremely efficient method of heating the gas stream, since heat is lost only through conduction out the containing pipe. This same method can be used to heat the gas leaving the reactor, which may prove desirable if the methane reforming reaction is practiced.

It is also clear that the process just described can be readily adapted to the changing character of the solid waste input. For example, should the wastes contain substances that might poison the catalysts used to produce a particular product, the process described here would readily adapt to the production of some other product using a different catalyst. Moreover, by varying the composition of the working fluid and catalysts almost any desired mixture of the product gas can be produced. For example, a product gas rich in CO may be produced by using $CO_2$ as the working fluid. As opposed to many other pyrolysis systems, this process primarily has only gaseous products which are readily salable. Any ash residue produced is readily disposed of. Since the steam or $CO_2$ reactant can be heated by burning some of the stored producer gas, the process readily combines with a solar furnace and would not have to "shut down" on a cloudy day. Moreover, current tecnhology is sufficient for the design and construction of a solar furnace with an output temperature of 600° C–700° C. The process described here is also unique due to its ability to store heat energy supplied from an external source in the producer gas. If desired, the process can produce electricity by burning the producer gas in a turbine generator. If not burned to produce electricity, the hot gases evolved by the process may be cooled in a heat exchanger and used to provide steam or hot $CO_2$ to the solar furnace. Thus the process is able to efficiently use all the heat produced by the solar furnace in a temperature range of 600° C–700° C.

A tower top solar furnace appears to be well suited to meet the needs for the system of this invention. This type of furnace uses many flat individually guided mirrors (heliostats) to reflect and focus solar light to the top of a tower where it is converted to heat. G. Francia, Solar Energy 12, 51 (1968) describes the use of such a furnace for the continuous daylight generation of 150 kg./hr. of steam at 150 atm. and 500°–700° C.

The chemical reactor described in the Drawing is ideally suited for use with a tower top solar furnace. Focused sunlight passing through the two quartz windows is absorbed on the surface of the char present in the fluidized bed and converted to heat. The excellent thermal transfer properties of the fluidized bed distributes the heat throughout the bed. Steam or hot $CO_2$ flowing through perforations in the inner quartz window fluidize the bed. Finely ground organic solids are admitted through the airlock on the top of the reactor. Upon contact with the fluidized bed these solids undergo rapid pyrolysis resulting in char and gases. The gases are recirculated under pressure as shown. Thermal losses from the reactor are limited by the insulation properties of the $CO_2$ and steam present between the reactor and the jacket. The primary advantage of this reactor is that it simplifies heat exchange problems by converting radiant light energy to thermal energy on the surface of the reactants where the endothermic reactions are occurring.

This scheme could also be used as a heat exchanger to superheat steam for the production of electricity. For this application, only steam would be pumped into the reactor and the fluidized bed would contain some unreactive, black, finely ground solid (black quartz) to absorb the radiant energy.

The major obstacle confronting the use of solar thermal energy is its intermittent nature. Utilities have to generate electricity all day long; not just when the sun shines. Using solar furnaces to produce a synthetic fuel circumvents this problem since the fuel serves as a means of storing the sun's energy for use at any time. Thus the production of synthetic fuels from solid wastes represents an ideal use of a solar furnace.

The inventor has discovered catalysts which are useful in lowering the temperature range for the practice of reaction (4):

$$CO_2 + C \xrightarrow{\text{catalyst}} 2CO \;.$$

The catalysts are cobalt molybdate and $NaHCO_3$. Using pyrolytic char from solid wastes as a source of carbon, the catalysts are dissolved in water and deposited on the char by soaking the char in the catalyst-water solution and subsequently vaporizing the water. The catalyst is recovered by soaking the ash residue remaining after the gasification of the solid waste and water. Table II shows the effect of this catalyst on reaction (4).

What I claim is:

1. A method of producing gases such as $CO_2$, $CO$, $CH_4$, and $H_2$ from the pyrolysis and gasification of solid organic waste contained within a reactor comprising:
    a. solar heating by means of a solar top furnace to a temperature of 600°–700° C a working fluid selected from the class consisting of steam, $CO_2$, or a mixture of these gases, said working fluid contained in the lower section of said reactor situate at the focus of the said solar top furnace, b. mixing at least one catalyst selected from the class consisting of $NaHCO_3$ and cobalt molybdate with the solid organic waste, c. injecting under pressure the heated working fluid into a porous reactant bed on which is situate the catalyst-mixed organic waste, d. pyrolyzing the catalyst-mixed organic waste causing the formation of $CO_2$, $CO$, $CH_4$, and $H_2$ gases, and a char residue, e. extracting the gases and char from the reactor, and f. recovering the said catalyst by soaking the char with water.

2. The method of claim 1 in which said gas is steam.

3. The method of claim 1 in which said gas is $CO_2$.

4. The method of claim 1 in which the said gas is a mixture of $CO_2$ and steam.

5. The method of claim 1 in which said catalyst is cobalt molybdate.

6. The method of claim 1 in which said catalyst is $NaHCO_3$.

* * * * *